(12) United States Patent
Rahman

(10) Patent No.: US 12,513,208 B2
(45) Date of Patent: Dec. 30, 2025

(54) DYNAMIC ROUTING OF VOICEMAIL REQUESTS USING LOCATION INFORMATION OF SUBSCRIBER DEVICE

(71) Applicant: T-Mobile USA, Inc., Bellevue, WA (US)

(72) Inventor: Muhammad Tawhidur Rahman, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 4 days.

(21) Appl. No.: 18/629,678

(22) Filed: Apr. 8, 2024

(65) Prior Publication Data

US 2025/0317486 A1    Oct. 9, 2025

(51) Int. Cl.
*H04L 67/1029* (2022.01)
*H04L 61/4511* (2022.01)
*H04L 67/1031* (2022.01)

(52) U.S. Cl.
CPC ...... *H04L 67/1029* (2013.01); *H04L 61/4511* (2022.05); *H04L 67/1031* (2013.01)

(58) Field of Classification Search
CPC ............. H04L 61/4511; H04L 67/1021; H04L 67/1029; H04L 67/1031
See application file for complete search history.

(56) References Cited

U.S. PATENT DOCUMENTS

| | | | |
|---|---|---|---|
| 7,454,500 B1 * | 11/2008 | Hsu ...................... | H04L 67/1001 709/226 |
| 7,653,700 B1 * | 1/2010 | Bahl ....................... | H04L 61/45 709/227 |
| 8,195,130 B2 | 6/2012 | Hao et al. | |
| 8,369,266 B2 * | 2/2013 | Jin .......................... | G01S 19/48 455/435.2 |
| 8,412,817 B1 * | 4/2013 | Bharathula ........... | H04M 3/367 709/224 |
| 8,422,645 B1 * | 4/2013 | Wong ................ | H04M 3/53325 709/224 |
| 8,730,970 B2 | 5/2014 | Allison et al. | |
| 10,812,442 B1 * | 10/2020 | Gray ................... | H04L 43/0864 |
| 11,909,920 B2 | 2/2024 | Brahma | |

(Continued)

FOREIGN PATENT DOCUMENTS

| CN | 1985502 A | 6/2007 |
|---|---|---|
| CN | 101002457 A | 7/2007 |

(Continued)

*Primary Examiner* — David R Lazaro
(74) *Attorney, Agent, or Firm* — Perkins Coie LLP

(57) ABSTRACT

The disclosed technology performs dynamic routing of a request to create a voicemail associated with a call session for a wireless communication device. Upon receiving the request, a query is sent to a DNS server of a wireless network to identify location information of the wireless communication device. The DNS server determines a voicemail server geographically proximate to the wireless communication device based on the information in the query and one or more location mapping tables and/or pre-defined mapping logics stored in the DNS server. Upon receiving information of the voicemail server as output of the query, the request to create the voicemail is routed to the voicemail server geographically proximate to the wireless communication device.

15 Claims, 8 Drawing Sheets

(56) References Cited

U.S. PATENT DOCUMENTS

| | | | | |
|---|---|---|---|---|
| 2006/0025114 | A1* | 2/2006 | Bales | H04M 3/533 455/414.1 |
| 2006/0112170 | A1* | 5/2006 | Sirkin | H04L 67/1021 709/224 |
| 2008/0205603 | A1* | 8/2008 | Allison | H04W 4/02 379/88.12 |
| 2010/0151831 | A1* | 6/2010 | Hao | H04M 3/53325 455/412.2 |
| 2010/0285817 | A1* | 11/2010 | Zhao | H04W 4/02 455/456.3 |
| 2011/0051658 | A1* | 3/2011 | Jin | H04W 4/02 370/328 |
| 2012/0003974 | A1* | 1/2012 | Nylander | H04W 24/02 455/435.2 |
| 2013/0297596 | A1* | 11/2013 | Mouline | G06F 16/9537 707/723 |
| 2014/0047104 | A1* | 2/2014 | Rodriguez | H04L 67/1023 709/224 |
| 2015/0058467 | A1* | 2/2015 | Douglas | H04L 67/51 709/223 |
| 2017/0126502 | A1* | 5/2017 | Horstmann | H04L 67/1008 |
| 2019/0166210 | A1* | 5/2019 | Froger | H04L 67/1021 |
| 2020/0186613 | A1* | 6/2020 | Johns | H04L 67/60 |
| 2020/0366648 | A1* | 11/2020 | Kuppannan | H04L 63/0263 |
| 2023/0052177 | A1* | 2/2023 | Edge | H04B 7/18528 |
| 2023/0141097 | A1* | 5/2023 | Brahma | H04L 65/1096 370/254 |
| 2024/0089290 | A1* | 3/2024 | M M | H04L 63/08 |

FOREIGN PATENT DOCUMENTS

| | | |
|---|---|---|
| CN | 101365011 A | 2/2009 |
| CN | 101510921 A | 8/2009 |
| CN | 103685360 A | 3/2014 |
| CN | 105430148 B | 1/2019 |
| CN | 106101396 B | 4/2019 |
| CN | 112400307 A | 2/2021 |
| CN | 111429896 B | 3/2021 |
| DE | 10297189 T5 | 9/2004 |
| DE | 05009011 T1 | 2/2006 |
| DE | 04807639 T1 | 1/2007 |
| DE | 102006040264 A1 | 3/2008 |
| DE | 102021203766 A1 | 10/2021 |
| EP | 1242918 A1 | 9/2002 |
| EP | 1454475 A1 | 9/2004 |
| EP | 1618735 A2 | 1/2006 |
| EP | 1599022 B1 | 9/2007 |
| EP | 1851939 A2 | 11/2007 |
| EP | 1987659 A2 | 11/2008 |
| EP | 2320632 A1 | 5/2011 |
| EP | 1959658 B1 | 1/2013 |
| EP | 2713592 A1 | 4/2014 |
| EP | 2352273 B1 | 1/2017 |
| EP | 2605494 B1 | 2/2019 |
| EP | 2566143 B1 | 11/2019 |
| JP | 2001273225 A | 10/2001 |
| JP | 2008199202 A | 8/2008 |
| JP | 2011521496 A | 7/2011 |
| JP | 2014023052 A | 2/2014 |
| JP | 5843325 B2 | 11/2015 |
| JP | 2018514169 A | 5/2018 |
| JP | 6694069 B2 | 4/2020 |
| JP | 7045104 B2 | 3/2022 |
| KR | 100265509 B1 | 9/2000 |
| KR | 100587161 B1 | 6/2006 |
| KR | 100587779 B1 | 6/2006 |
| KR | 100611409 B1 | 8/2006 |
| KR | 100626165 B1 | 9/2006 |
| KR | 100766611 B1 | 10/2007 |
| KR | 100778643 B1 | 11/2007 |
| KR | 100779846 B1 | 11/2007 |
| KR | 100860096 B1 | 9/2008 |
| KR | 20140093170 A | 7/2014 |
| KR | 101882353 B1 | 8/2018 |
| KR | 102394404 B1 | 5/2022 |
| WO | 2007091261 A1 | 8/2007 |
| WO | 2008005924 A2 | 1/2008 |
| WO | 2008042300 A2 | 4/2008 |
| WO | 2010126832 A2 | 11/2010 |
| WO | 2012048749 A1 | 4/2012 |
| WO | 2012091943 A1 | 7/2012 |
| WO | 2017105359 A1 | 6/2017 |
| WO | 2021140470 A1 | 7/2021 |

* cited by examiner

DYNAMIC ROUTING OF VOICEMAIL REQUESTS USING LOCATION INFORMATION OF SUBSCRIBER DEVICE

BACKGROUND

A voicemail system is a computer-based system that allows users and subscribers to exchange personal voice messages, select and deliver voice information, and process transactions using a telephone. After voicemails are recorded, a voicemail server converts the voicemails into generic audio files that most mobile phones or computers will be able to play without a need for special software.

BRIEF DESCRIPTION OF THE DRAWINGS

Detailed descriptions of implementations of the present invention will be described and explained through the use of the accompanying drawings.

Figure 1:
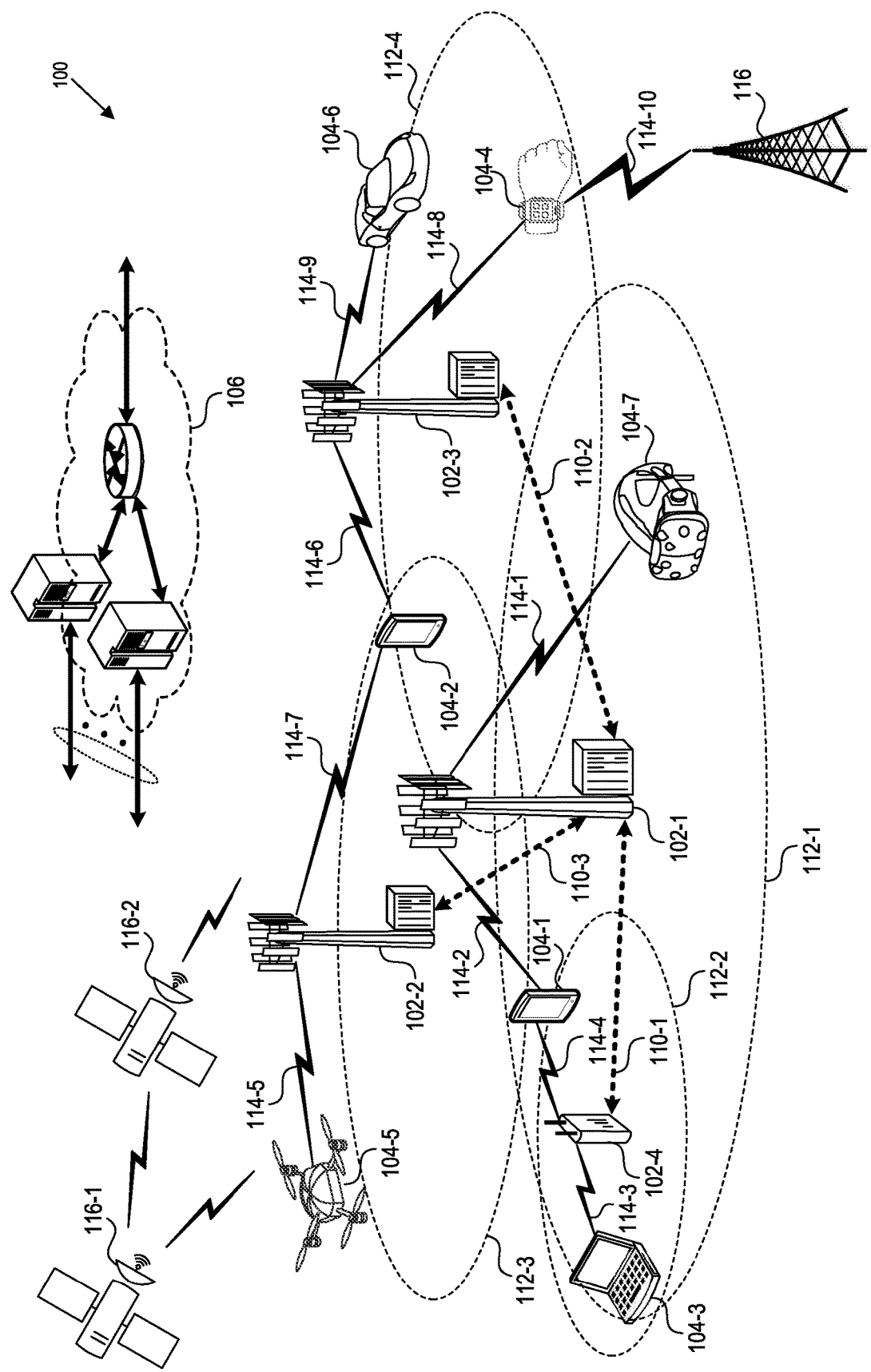
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In wireless communications, users use devices to initiate phone calls to other users. There are cases where phone calls do not reach a terminating party due to various reasons, such as a network failure preventing connection, radio paging issues, protocol issues, and/or impairments associated with a wireless network, devices, or transport. In such cases, an originating party that initiated the call is given an option to leave a voicemail for the terminating party. Traditionally, mobile network operators have multiple voicemail servers each associated with pre-designated subscribers. Each voicemail server has a pilot number such that each subscriber of the mobile network is pre-allocated to be associated with a single server. This creates inherent challenges for mobile network operators that are looking to provide efficient and proximate voicemail routing services for subscribers by causing delays in voicemail setup times and load imbalances across multiple voicemail servers, The disclosed technologies address these and other problems of conventional mobile networks by using real-time or near real-time location information of callers to route voicemails to proximate voicemail servers for efficiency. Identification of location of callers can be done based on cell global identity (CGI) information. The CGI information is part of the Session Initiation Protocol (SIP) used for establishing voice calls or voicemail. Core network nodes initiating a call path towards voicemail servers can send a query to a Domain Name System (DNS) server that stores the CGI information. Upon receiving the query, the DNS server can look up the CGI information of callers to map locations of the callers to proximate voicemail servers. The output of the query includes information regarding proximate voicemail servers and is sent to the core network nodes, which can then select appropriate voicemail servers based on additional factors such as existing loads of the proximate voicemail servers and/or server status determined based on internal management algorithm. As a result, subscribers can benefit from faster voicemail setup time based on the routing techniques implemented.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

5G Core Network Functions

Figure 2:
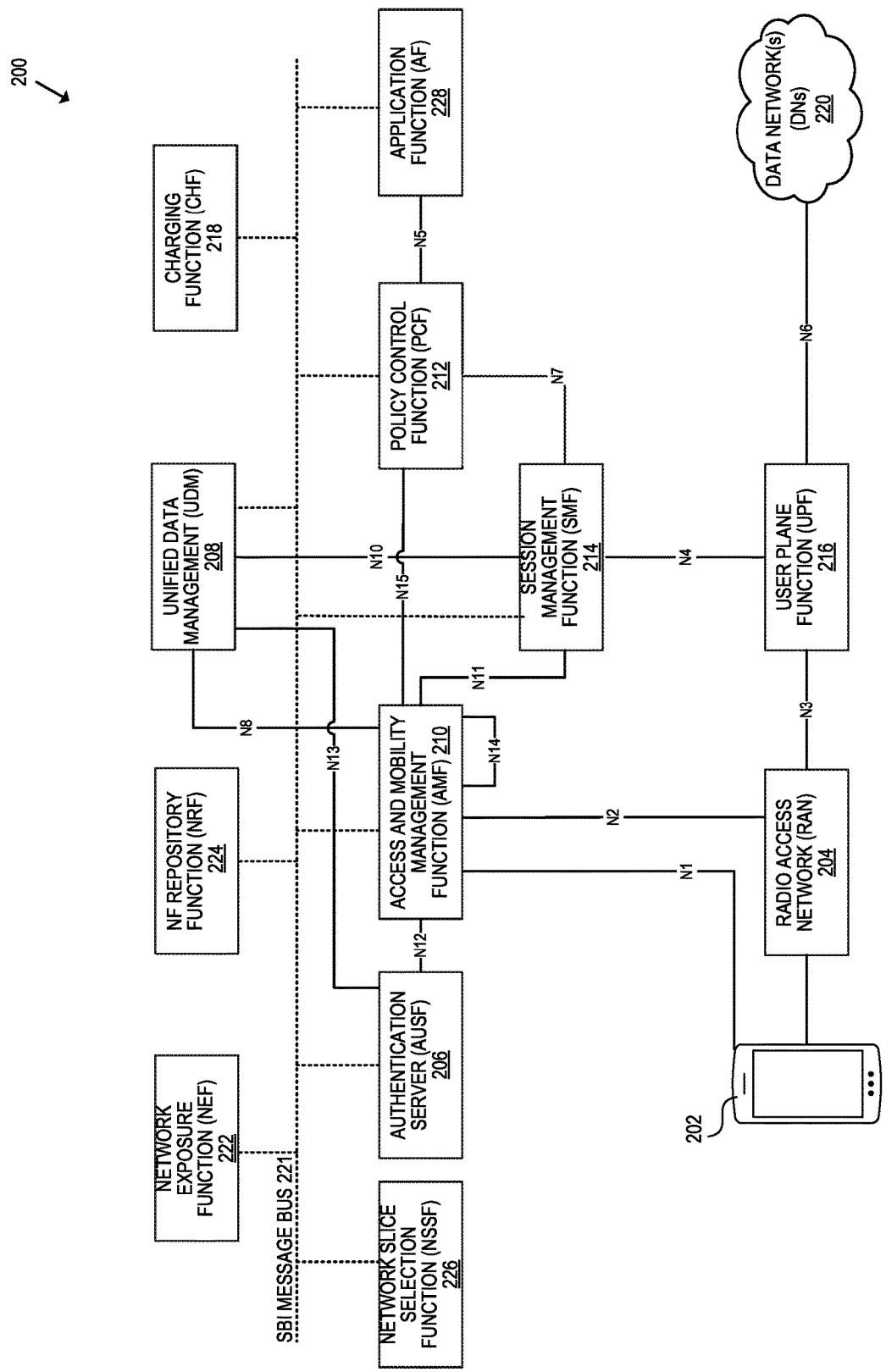
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Dynamic Routing of Voicemail Requests

Figure 3:
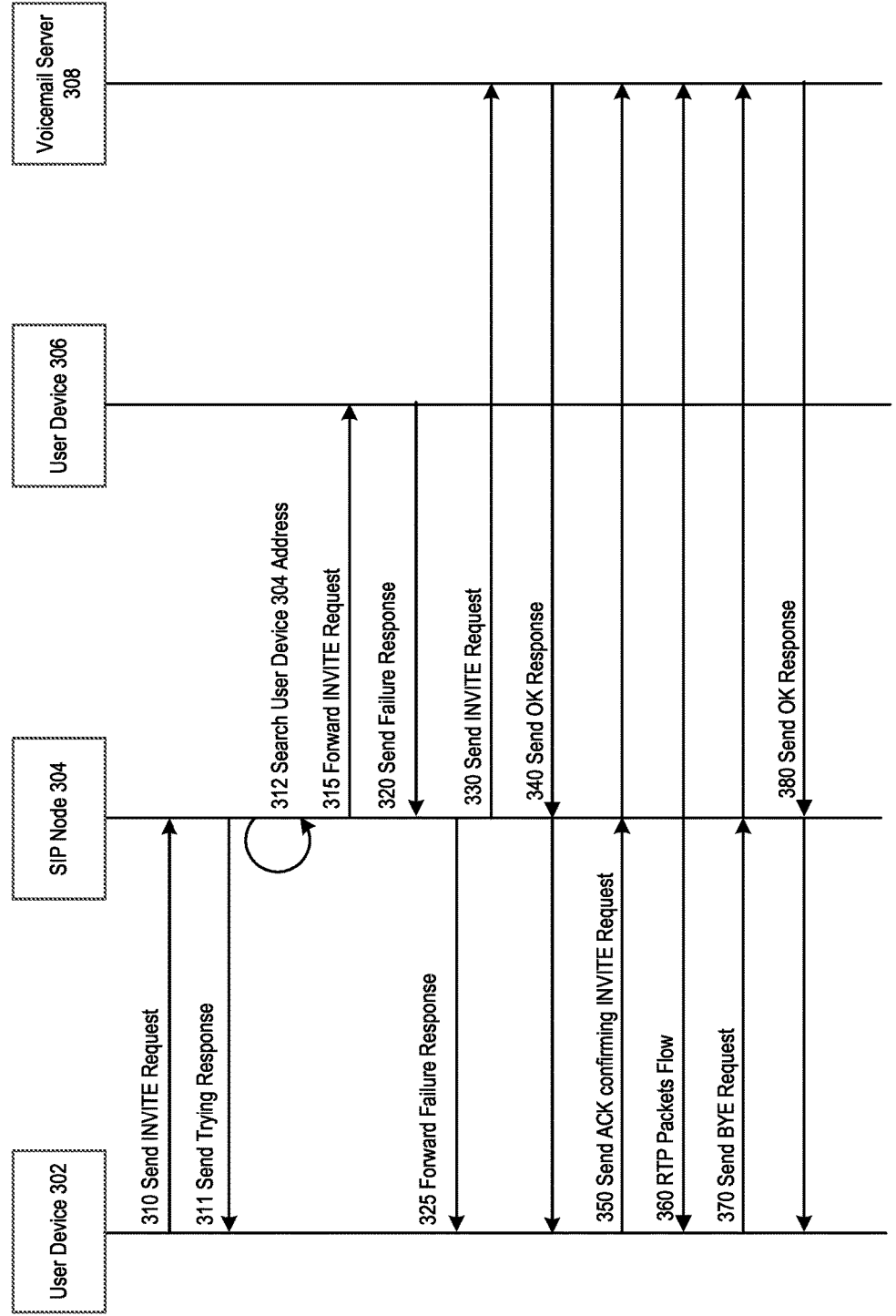
FIG. 3 is a flowchart representation of an example call flow of a session initiation protocol (SIP) session between user devices being redirected to a voicemail server.

A voicemail system is a computer-based system that allows users and subscribers to exchange personal voice messages and to select and deliver voice information. Under the Session Initiation Protocol (SIP), voicemail servers are identified by a Uniform Resource Identifier (URI), similar to other resources such as user agents, call routers. FIG. 3 is a flowchart representation of an example call flow of a SIP session between user device 302 and user device 306 being redirected to a voicemail server 308. The call flow 300 comprises, at Operation 310, sending, by the user device 302, an INVITE request to a SIP node 304 that is responsible for initiating the SIP session. At Operation 311, immediately after receiving the INVITE request from the user device 302, the SIP node 304 sends a Trying response to the user device 302 to stop re-transmissions of the INVITE request.

At Operation 312, the SIP node 304 searches the address of user device 306. The SIP node 304 can communicate with a location server or a database to obtain the address of user device 306. In some implementations, Operation 312 involves the SIP node 304 transmitting a voicemail routing request to the database. The voicemail routing request can be configured to identify the user device 306 and/or a user profile associated with the user device 306. In response to the voicemail routing request, the database can generate a voicemail routing response that includes a voicemail routing profile based on the user profile associated with the user device 306. At Operation 315, after obtaining the address of user device 306, the SIP node 304 forwards the INVITE request to the user device 306.

At Operation 320, a failure response is generated and sent to the SIP node 304. The failure response can be generated in various circumstances, including request failures due to the user device 306 failing to establish the SIP session by missing or rejecting a call, server errors, and/or global failures. At Operation 325, the SIP node 304 forwards the failure response to the user device 302.

At Operation 330, because the user device 306 is unavailable, the SIP node 304 sends an INVITE request to the voicemail server 308 to redirect the SIP session to the voicemail server 308. At Operation 340, the voicemail server 308 sends an OK response to the SIP node 304, which is forwarded to the user device 302.

At Operation 350, the user device 302 sends an ACK to the SIP node 304, which is forwarded to the voicemail server 308. The ACK confirms the INVITE request and establishes the session between the user device 302 and the voicemail server 308. At Operation 360, real-time transport (RTP) packets start flowing between the user device 302 and the voicemail server 308, which indicates an on-going communication between the user device 302 and the voicemail server 308. The communication can include a voicemail deposit session with the voicemail server 308 wherein the user device 302 is enabled to deposit a voicemail for the user device 306 in the voicemail server 308.

At any time during the session, the user device 302 can terminate the session by sending a BYE request. At Operation 370, the user device 302 sends the BYE request to the SIP node 304, which forwards the BYE request to the voicemail server 308. At Operation 380, the voicemail server 308 sends an OK response to the SIP node 304 to confirm the BYE request, effectively terminating the session. The OK response is forwarded to the user device 302.

In some cases, a user device is busy or unavailable to establish the call session requested by a mobile network. In other cases, the mobile network fails to reach the user device due to various challenges, such as radio paging issues, protocol issues, and/or impairments within the mobile network, user device, or transport. In some implementations, unanswered communication sessions, such as the session illustrated in FIG. 3, are routed to a voicemail server associated with a mobile network.

Figure 4:
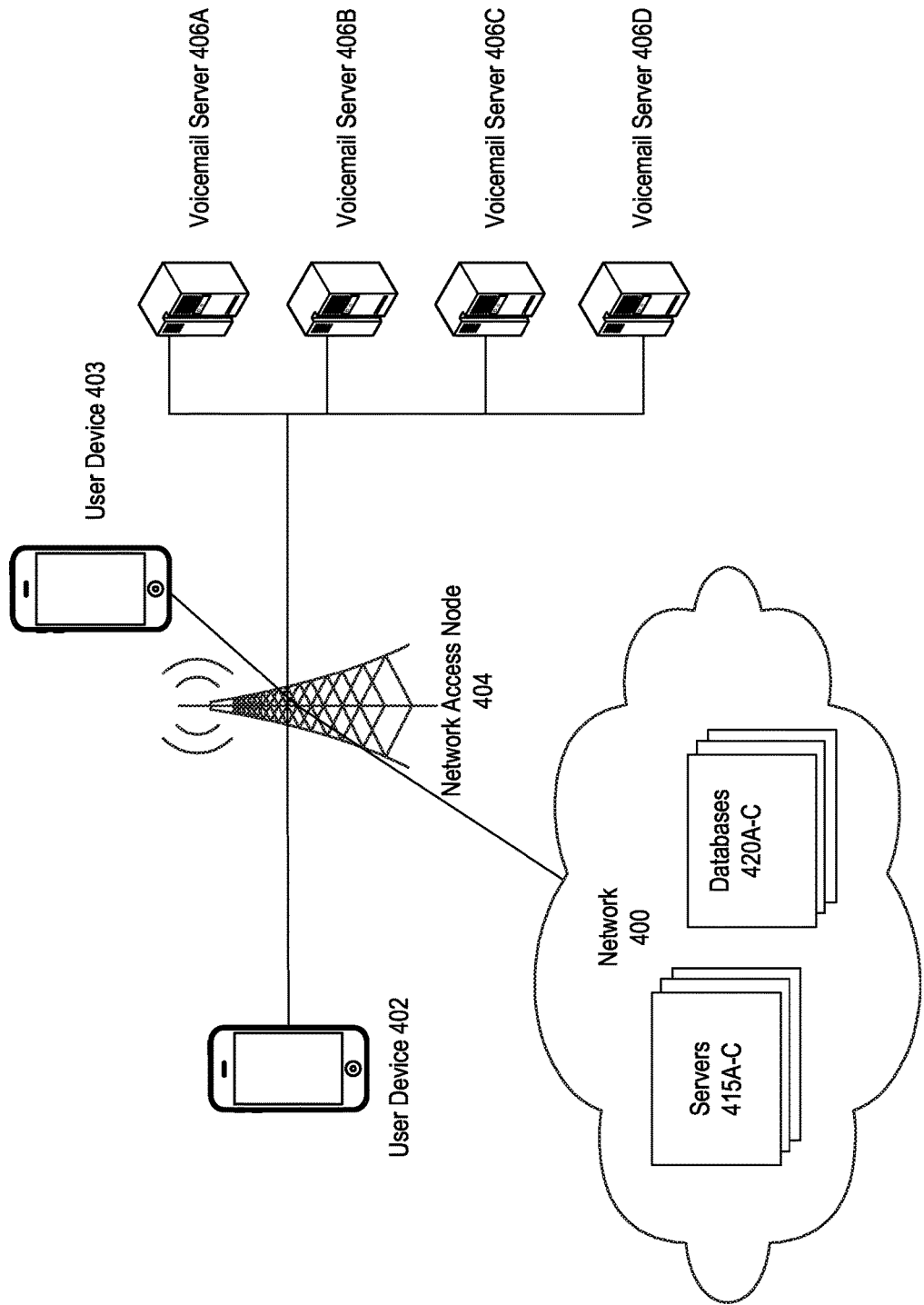
FIG. 4 is a block diagram that illustrates a network that utilizes cellular network infrastructure to receive communication session requests from user devices and forward unanswered communication session requests to voicemail servers.

FIG. 4 is a block diagram that illustrates a network that utilizes cellular network infrastructure to receive communication session requests from user devices and forward unanswered communication session requests to voicemail servers. As illustrated in FIG. 4, the network 400 includes communication servers 415A-C that operate as platforms for communication applications. The network 400 also includes multiple databases 420A-C which store various types of data including, but not limited to, call-detail data, network data, and subscriber data. The network 400 is not limited to the depicted network nodes and can also include additional access networks, network nodes, and network functions not depicted in the diagram. As explained in relation with FIG. 3 above, a user device 402 can send a request to initiate an SIP session with another mobile device, such as a user device 403. When the request to initiate the SIP session goes unanswered, a network access node 404 of a network 410 can redirect the SIP session to a voicemail server associated with the network 410.

Traditionally, mobile network operators have multiple voicemail servers, such as the voicemail servers 406A-D illustrated in FIG. 4, each associated with pre-assigned subscribers. When a subscriber joins the mobile network, the mobile network operator assigns a static voicemail routing number, also known as a voicemail pilot number, to the subscriber. The static voicemail routing number is assigned for each subscriber who is identified via each subscriber's Mobile Station International Subscriber Directory Number (MSISDN), and each static voicemail routing number is associated with one of the voicemail servers of the mobile network. Mobile network operators assign static voicemail routing numbers in order to distribute subscribers across available voicemail routing numbers to realize balanced distribution of traffic load among existing voicemail servers.

For example, referring to FIG. 4, a mobile network operator has a total of 4 million subscribers. In order to evenly distribute the subscribers among the four voicemail servers, the mobile network operator can assign static voicemail routing number A to user profiles of 1 million subscribers. Subscribers who are assigned voicemail routing number A are routed to voicemail server 406A. Similarly, the mobile network operator assigns static voicemail routing number B to user profiles of 1 million other subscribers, whose voicemail requests are routed to voicemail server 406B. The mobile network operator can assign voicemail routing numbers C and D to the remaining 2 million subscribers in a similar fashion, thereby assigning an equal number of subscribers to each voicemail server.

However, such an approach has a number of drawbacks. First of all, having a balanced split of subscribers across available voicemail routing numbers is difficult to achieve because provisioning of new subscribers is performed much earlier in the mobile network before the subscribers get onboard with a mobile carrier. Second, this approach fails to take into account latency issues that can arise due to subscribers being assigned to voicemail servers that are located distant from the subscribers. For example, referring back to the example above, the mobile network operator assigns static voicemail routing number A to a subscriber residing in California. The voicemail server 406A associated with the static voicemail routing number A is located in Virginia, whereas the voicemail server 406B is located in California. Due to varying distances between the location of the subscriber an the voicemail servers, the subscriber residing in California would experience less latency and faster setup time if the subscriber's voicemail requests were routed to the voicemail server 406B. The above approach of evenly distributing subscribers among existing voicemail routing numbers ignores such geographical advantages.

In another example, a subscriber who initially subscribed to the mobile network in New York relocates from New York to Seattle while retaining the MSISDN. When the subscriber initiates a voicemail request, the request is routed to a voicemail server based in New York because the subscriber was originally assigned a static voicemail routing number associated with the voicemail server based in New York.

Unbalanced load distribution across various voicemail servers can push loads in some voicemail servers to the point of maximum utilization and cause congestions and timeouts in extreme cases. In such situations, the mobile networks operators have to reevaluate which of the voicemail servers provides optimal and efficient services to the affected subscribers.

The disclosed technologies address possible drawbacks, e.g., routing latencies, of existing voicemail routing processes by proposing a different voicemail routing technique. Specifically, the voicemail routing technique involves routing a voicemail request to a voicemail server that is geographically close to the subscriber that initiates the voicemail requests using the CGI information stored in the P-ANI header to map and select voicemail servers based on geographic proximity. Traditional voicemail routing techniques require prior storing of a voicemail routing profile associated with a user device initiating a voicemail request in a database. Upon receiving a voicemail request, the voicemail request is transmitted to the database to retrieve the stored voicemail routing profile, which is subsequently used to establish a voicemail session. The techniques described herein can be implemented in various embodiments to eliminate the need for storing voicemail profiles or similar provisioning of voicemail services. Instead, the disclosed techniques provide voicemail routing based on real-time or near real-time location information of a subscriber associated with the voicemail request. In some implementations, the voicemail routing technique involves utilizing load information associated with one or more voicemail servers to determine preferred geographically proximate voicemail servers with loads below a threshold.

Figure 5:
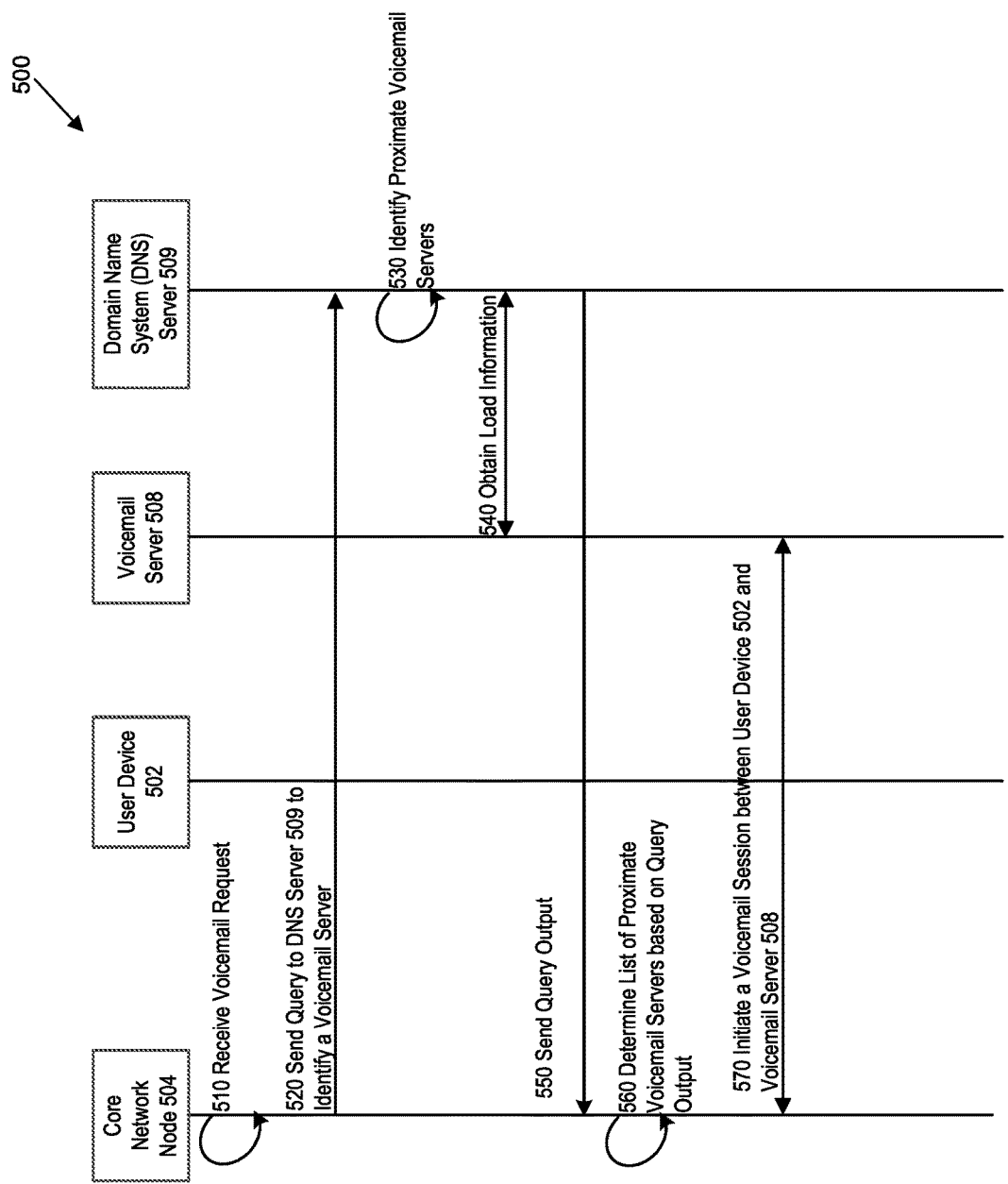
FIG. 5 is a flowchart representation of an example process for routing voicemail requests to proximate voicemail servers in accordance with one or more embodiments of the present technology.

FIG. 5 is a flowchart representation of an example process for routing voicemail requests to proximate voicemail servers in accordance with one or more embodiments of the present technology. Other implementations of the process 500 include additional, fewer, or different steps or performing the steps in different orders.

At Operation 510, a core network node 504 receives a voicemail request associated with a user device 502 from a wireless communication node. The core network node 504 refers to any core network node that can initiate a call path towards one or more voicemail servers. The core network node 504 can be a telephony application server (TAS), a media gateway control function (MGCF), or a breakout gateway control function (BGCF), depending on the configuration of the mobile network.

At Operation 520, after receiving the voicemail request associated with the user device 502, the core network node 504 sends a query to the DNS server 509 to identify a voicemail server based on the location of user device 502 associated with the voicemail request. The query includes CGI information of the user device 502. The core network node 504 sends the query to the DNS server 509 because the core network node 504 does not have the capability to translate the CGI information to the geographic location of the user device 502.

In some implementations, within the SIP framework is an information element called Primary-Access Network Information (P-ANI) header that includes CGI information associated with the user device 502. The CGI information includes cell site information of a serving cell the user device 502 is camped in. A relative location of the user device 502 can be determined using the CGI information of the serving cell which is providing services to the user device 502.

At Operation 530, upon receiving the query from the core network nodes, the DNS server 509 identifies proximate voicemail servers for the user device 502 using the CGI information in the query and information stored in the DNS server 509. In some implementations, the DNS server 509 includes one or more location mapping tables and/or one or more pre-define logic to determine a voicemail server proximate to the user device 502. Using the information stored in the DNS server 509 and the CGI information in the received query, the DNS server 509 can identify the location of the user device 502 and subsequently identify one or more voicemail servers that are proximate to the user device 502.

In an example, the DNS server 509 identifies that the user device 502 is located in Orange County, California. Based on the identified location, the DNS server 509 identifies a voicemail server located in Orange County, followed by voicemail servers located in neighboring counties, such as Los Angeles County and Riverside County, which can be used if the voicemail server located in Orange County is unresponsive. In other implementations, other standards for geographic proximity are applied. Geographically proximate servers can refer to voicemail servers within the same city, the same county, the same state, or a group of states making up a region as the user device.

In some embodiments, at Operation 540, the DNS server 509 obtains load information associated with the one or more voicemail servers that are proximate to the user device 502. For example, a mechanism can be implemented such that the DNS server 509 periodically receives load information associated with each voicemail server. The mechanism triggers an alert if the number of consecutive missed reports from a given voicemail server to the DNS server 509 exceeds a pre-determined threshold value. In another example, the load information is obtained only in response to a trigger, such as a DNS query from the DNS server to the voicemail server. In some implementations, the DNS server 509 keeps track of responses to the DNS query to calculate a history of load information for the one or more voicemail servers.

At Operation 550, the DNS server 509 sends a query output to the core network node 504. In some implementations, the query output includes one or more voicemail servers that are proximate to the user device 502. In other implementations, the query output is a list of voicemail servers ranked based on geographic proximity to the user device 502. In some implementations, the query output sent by the DNS server 509 includes load information obtained by the DNS server 509 based on communication with the one or more voicemail servers.

At Operation 560, the core network node 504 determines one or more proximate voicemail servers based on the query output. After determining the voicemail server 508 as the voicemail server that is geographically closest to the location of the user device 502 based on the query output, the core network node 504 proceeds to Operation 570, initiating a voicemail session between the user device 502 and the voicemail server 508. During the voicemail session, the user device 502 is enabled to deposit a voicemail.

In some implementations, in determining the one or more proximate voicemail servers, the core network node takes load balance into consideration. After examining the load information associated with the one or more proximate voicemail servers and determining that the load associated with the voicemail server 508 is below a pre-determined threshold, the core network node 504 proceeds to Operation 570 to initiate a voicemail session between the user device 502 and the voicemail server 508. In another example, upon receiving a list of proximate voicemail servers and determining that a voicemail server closest to the location of the user device 502 has reached a point of overload, the core network node 504 selects a voicemail server second closest to the location of the user device 502 after confirming that the load has not exceeded the pre-determined threshold.

In other implementations, the core network node 504 determines that the load information associated with the voicemail server 508 is outdated, or that more information is needed before establishing connection. In such cases, the core network node 504 can communicate with the voicemail server 508 to receive additional load information. The additional load information can indicate that the load of the voicemail server 508 has exceeded the pre-determined threshold. In such a situation, the core network node 504 sends another query to the DNS server 509 to reallocate DNS mapping to redistribute the load and identify another voicemail server in geographic proximity with the user device 502 whose load has not exceeded the pre-determined threshold.

Figure 6:
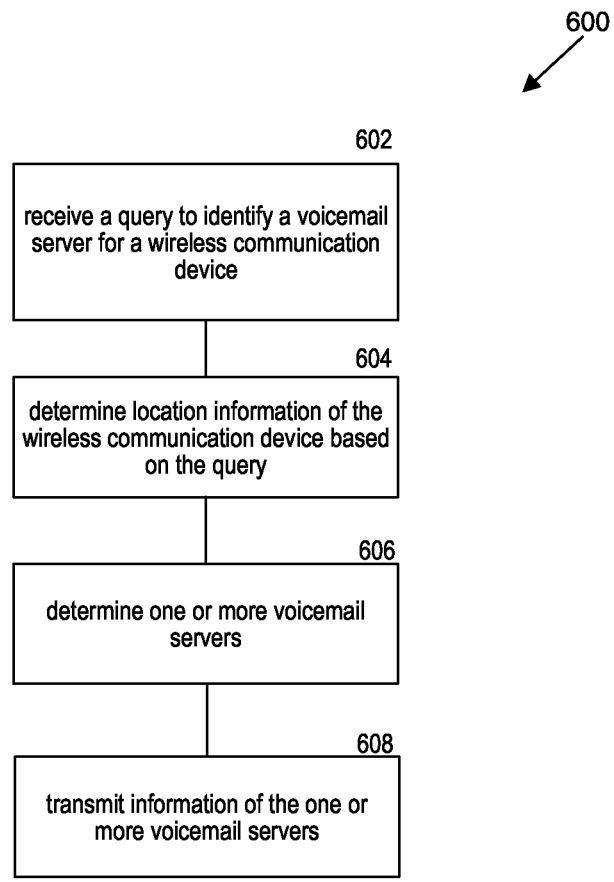
FIG. 6 is a flowchart representation of an example process for routing voicemail requests from a perspective of a domain name system (DNS) server in accordance with one or more embodiments of the present technology.

FIG. 6 is a flowchart representation of an example process 600 for routing voicemail requests from a perspective of a domain name system (DNS) server in accordance with one or more embodiments of the present technology.

At Operation 602, the DNS server receives a query from a network node to identify a voicemail server for a wireless communication device. The query is generated in response to a request to create a voicemail associated with a call session for the wireless communication device. The query includes CGI information associated with the wireless communication device.

At Operation 604, the DNS server determines location information of the wireless communication device based on the CGI information included in the query. In some implementations, the location information is further determined based on at least one of: one or more location mapping tables or one or more pre-defined mapping logics. At Operation 606, the DNS server determines one or more voicemail servers located proximate to the location of the wireless communication device.

At Operation 608, the DNS server transmits, as output of the query, information of the one or more voicemail servers located proximate to the wireless communication device. The output of the query can include a list of the one or more voicemail servers ranked based on geographic proximity to the wireless communication device. In some implementations, the DNS server receives load information associated with the one or more voicemail servers from the one or more voicemail servers located proximate to the location of the wireless communication device. The load information includes a load defining a percentage of a subscriber capacity associated with each of the one or more voicemail servers. In response to receiving the load information, the DNS server updates the output of the query based on the load information associated with the one or more voicemail servers.

In other implementations, the DNS server determines that the load information for a voicemail server is missing and sends a request to the voicemail server to report the load information. Upon receiving the load information from the voicemail server indicating a load above a pre-defined threshold or receiving no response from the voicemail server, the DNS server removes the voicemail server from the output of the query.

Figure 7:
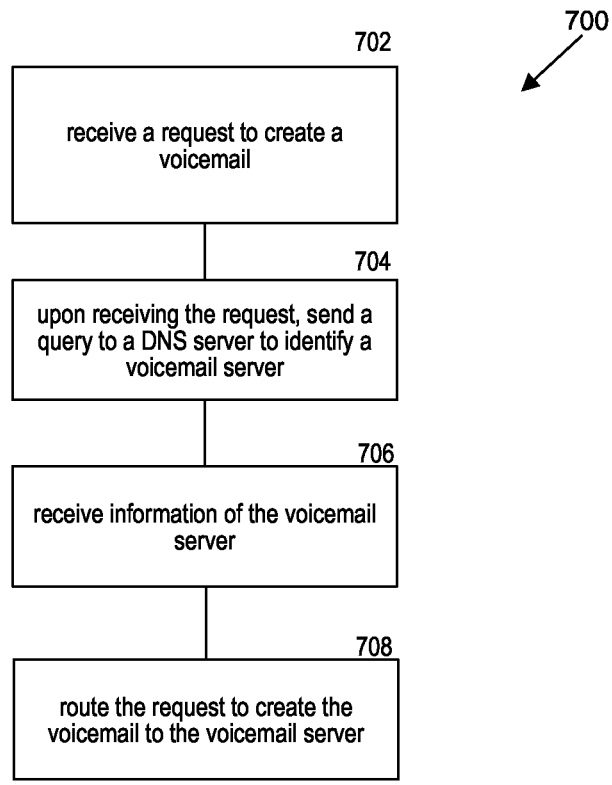
FIG. 7 is a flowchart representation of an example process for routing voicemail requests from a perspective of a network node in accordance with one or more embodiments of the present technology.

FIG. 7 is a flowchart representation of an example process for routing voicemail requests from a perspective of a network node in accordance with one or more embodiments of the present technology.

At Operation 702, the network node receives a request to create a voicemail associated with a call session for a wireless communication device. At Operation 704, upon receiving the request, the network node sends a query to a DNS server of a wireless network to identify a voicemail server for the wireless communication device. The query includes cell global identity (CGI) information associated with the wireless communication device;

At Operation 706, the network node receives, as output of the query, information of the voicemail server that is geographically proximate to the wireless communication device. In some implementations, the output of the query includes load information associated with the voicemail server that is geographically proximate to the wireless communication device. The load information includes a load defining a percentage of a subscriber capacity associated with the voicemail server. The load information of the voicemail server can include periodically updated near real-time load information of the voicemail server.

In some implementations, the network node compares the load of the voicemail server to a pre-determined threshold, and upon determining that the load exceeds the pre-determined threshold, the network node sends another query to the DNS server to determine another voicemail server geographically proximate to the wireless communication device. In other implementations where the load information of the voicemail server is missing, the network node establishes a connection to the voicemail server to determine status of the voicemail server.

At Operation 708, the network node routes the request to create the voicemail to the voicemail server that is geographically proximate to the wireless communication device. In some implementations, the output of the query includes a list of voicemail servers ranked based on geographic proximity to the wireless communication device. The network node can route the request to create the voicemail to the highest ranked voicemail server. In other implementations, the network node determines a load associated with each of the voicemail servers in the list of voicemail servers and compares the load associated with the highest ranked voicemail server to a pre-defined threshold. Upon determining the load associated with the highest ranked voicemail server exceeds the pre-defined threshold, the network node routes the request to create the voicemail to the next highest ranked voicemail server in the list of voicemail servers.

Computer System

Figure 8:
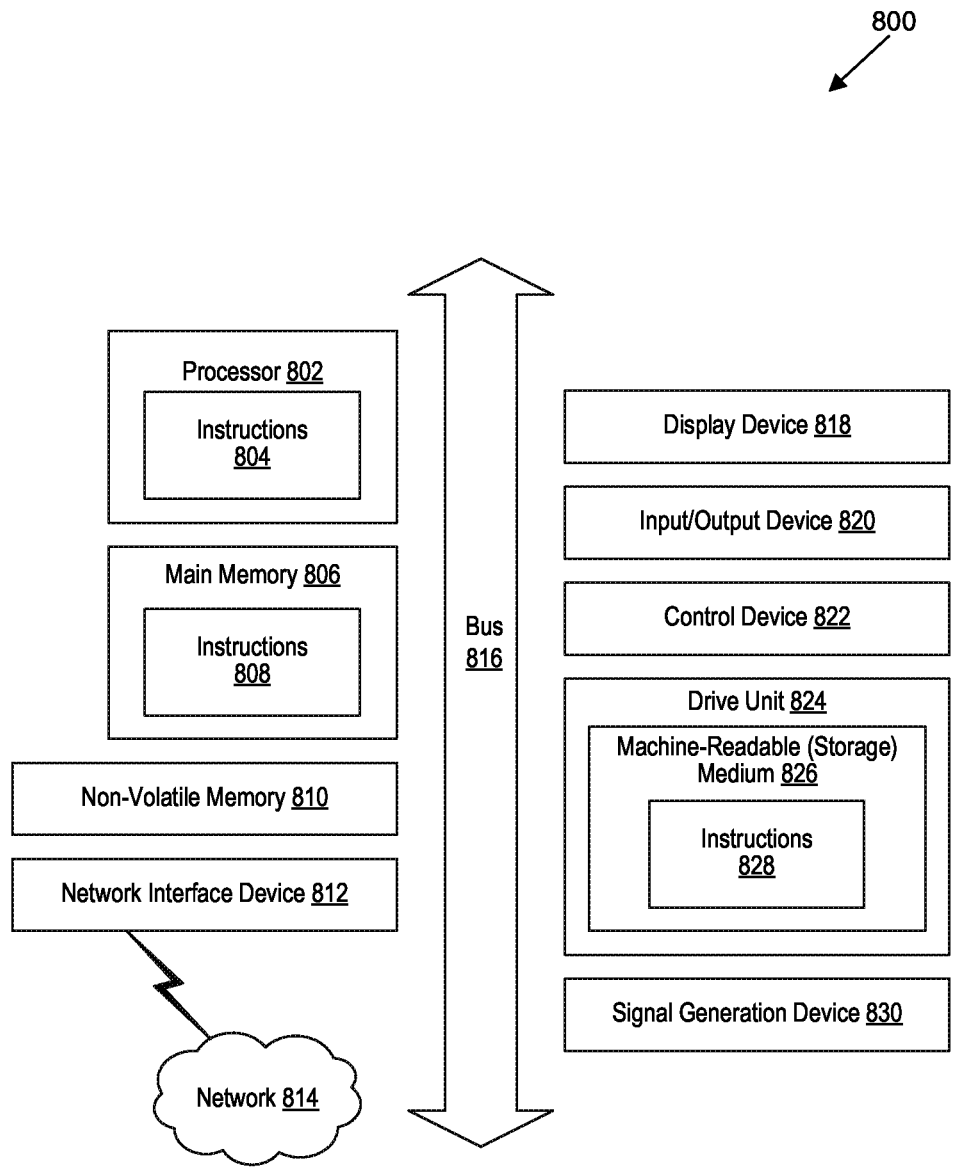
FIG. 8 is a block diagram that illustrates an example of a computer system in which at least some operations described herein can be implemented.

FIG. 8 is a block diagram that illustrates an example of a computer system 800 in which at least some operations described herein can be implemented. As shown, the computer system 800 can include: one or more processors 802, main memory 806, non-volatile memory 810, a network interface device 812, a video display device 818, an input/output device 820, a control device 822 (e.g., keyboard and pointing device), a drive unit 824 that includes a machine-readable (storage) medium 826, and a signal generation device 830 that are communicatively connected to a bus 816. The bus 816 represents one or more physical buses and/or point-to-point connections that are connected by appropriate bridges, adapters, or controllers. Various common components (e.g., cache memory) are omitted from FIG. 8 for brevity. Instead, the computer system 800 is intended to illustrate a hardware device on which components illustrated or described relative to the examples of the figures and any other components described in this specification can be implemented.

The computer system 800 can take any suitable physical form. For example, the computing system 800 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 800. In some implementations, the computer system 800 can be an embedded computer system, a system-on-chip (SOC), a single-board computer system (SBC), or a distributed system such as a mesh of computer systems, or it can include one or more cloud components in one or more networks. Where appropriate, one or more computer systems 800 can perform operations in real time, in near real time, or in batch mode.

The network interface device 812 enables the computing system 800 to mediate data in a network 814 with an entity that is external to the computing system 800 through any communication protocol supported by the computing system 800 and the external entity. Examples of the network interface device 812 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 806, non-volatile memory 810, machine-readable medium 826) can be local, remote, or distributed. Although shown as a single medium, the machine-readable medium 826 can include multiple media (e.g., a centralized/distributed database and/or associated caches and servers) that store one or more sets of instructions 828. The machine-readable medium 826 can include any medium that is capable of storing, encoding, or carrying a set of instructions for execution by the computing system 800. The machine-readable medium 826 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 810, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 804, 808, 828) set at various times in various memory and storage devices in computing device(s). When read and executed by the processor 802, the instruction(s) cause the computing system 800 to perform operations to execute elements involving the various aspects of the disclosure.

REMARKS

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number can also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. A method for wireless communication, comprising:
   receiving, by a domain name system (DNS) server, a query from a network node to identify a voicemail server for a wireless communication device,
   wherein the query is generated in response to a request to create a voicemail associated with a call session for the wireless communication device, and
   wherein the query includes cell global identity (CGI) information associated with the wireless communication device;
   determining, by the DNS server, location information of the wireless communication device based on the CGI information;
   determining one or more voicemail servers based on a location of the wireless communication device;
   receiving information of the one or more voicemail servers,
      wherein the information includes load information associated with the one or more voicemail servers, and
      wherein the load information includes a load defining a percentage of a subscriber capacity associated with each of the one or more voicemail servers;
   upon determining that the load exceeds a pre-defined threshold, determining, by the DNS server, another voicemail server geographically proximate to the wireless communication device; and
   transmitting, as an output of the query, the information of the one or more voicemail servers to the network node.

2. The method of claim 1, wherein the location information is further determined based on at least one of: one or more location mapping tables or one or more pre-defined mapping logics.

3. The method of claim 1, further comprising:
   determining that the load information for a voicemail server of the one or more voicemail servers is missing; and
   in response to the determining that the load information is missing, sending a request to the voicemail server to report the load information.

4. The method of claim 3, further comprising:
   upon receiving the load information from the voicemail server indicating a load above a pre-defined threshold or receiving no response from the voicemail server, removing the voicemail server from the output of the query.

5. The method of claim 1, wherein the output of the query includes a list of the one or more voicemail servers ranked based on geographic proximity to the wireless communication device.

6. The method of claim 5, further comprising:
   receiving, from the one or more voicemail servers, load information associated with the one or more voicemail servers; and
   adjusting the list of the one or more voicemail servers based at least on geographic proximity to the wireless communication device and the load information associated with the one or more voicemail servers.

7. A method for wireless communication, comprising:
   receiving, by a network node, a request to create a voicemail associated with a call session for a wireless communication device;
   upon receiving the request, sending a query to a domain name system (DNS) server of a wireless network to identify a voicemail server that is geographically proximate to the wireless communication device,
      wherein the query includes cell global identity (CGI) information associated with the wireless communication device;
   receiving, as an output of the query, information of the voicemail server, wherein the output of the query includes load information associated with the voicemail server, and
wherein the load information includes a load defining a percentage of a subscriber capacity associated with the voicemail server;
comparing the load to a pre-determined threshold; and
upon determining that the load exceeds the pre-determined threshold, sending another query to the DNS server to determine another voicemail server geographically proximate to the wireless communication device; and
routing the request to create the voicemail to the voicemail server.

8. The method of claim 7, wherein the load information of the voicemail server includes periodically updated near real-time load information of the voicemail server.

9. The method of claim 7, further comprising:
determining that the load information of the voicemail server is missing; and
in response to determining that the load information of the voicemail server is missing, establishing a connection to the voicemail server to determine status of the voicemail server.

10. The method of claim 7, wherein the output of the query includes a list of voicemail servers ranked based on geographic proximity to the wireless communication device, the method further comprising:
routing the request to create the voicemail to a highest ranked voicemail server.

11. The method of claim 10, further comprising:
determining a load associated with each of voicemail servers in the list of voicemail servers;
comparing the load associated with a highest ranked voicemail server to a pre-defined threshold; and
upon determining the load associated with the highest ranked voicemail server exceeds the pre-defined threshold, routing the request to create the voicemail to a next highest ranked voicemail server.

12. A system for wireless communication, the system comprising:
a domain name system (DNS) server; and
a network node,
wherein the network node is configured to:
receive a request to create a voicemail associated with a call session for a wireless communication device;
upon receiving the request, send a query to the DNS server to identify a voicemail server for the wireless communication device,
wherein the query includes cell global identity (CGI) information associated with the wireless communication device;
wherein the DNS server is configured to:
receive the request from the network node; and
determine location information of the wireless communication device based on the CGI information;
receive load information of the voicemail server,
wherein the load information includes a load defining a percentage of a subscriber capacity associated with the voicemail server;
upon determining that the load exceeds a pre-defined threshold, determine another voicemail server geographically proximate to the wireless communication device; and
transmit, as an output of the query, information of the voicemail server to the network node; and
wherein the network node is further configured to:
receive the information of the voicemail server, and
route the request to create the voicemail to the voicemail server to the wireless communication device.

13. The system of claim 12, wherein the DNS server includes one or more location mapping tables and/or one or more pre-defined mapping logics to determine a voicemail server located proximate to the wireless communication device.

14. The system of claim 12, wherein the output of the query includes a list of voicemail servers ranked based on geographic proximity to the wireless communication device, wherein the network node is further configured to:
route the request to create the voicemail to a highest ranked voicemail server.

15. The system of claim 14, wherein the network node is further configured to:
determine a load associated with each of voicemail servers in the list of voicemail servers;
compare the load associated with the highest ranked voicemail server to a pre-defined threshold; and
upon determining the load associated with the highest ranked voicemail server exceeds the pre-defined threshold, route the request to create the voicemail to a next highest ranked voicemail server.

* * * * *